(12) United States Patent
Valencia et al.

(10) Patent No.: US 7,904,466 B1
(45) Date of Patent: Mar. 8, 2011

(54) PRESENTING DIFFERENCES IN A FILE SYSTEM

(75) Inventors: Victor Valencia, Sunnyvale, CA (US); Ling Zheng, Sunnyvale, CA (US); Stephen Manley, Pleasanton, CA (US)

(73) Assignee: NetApp, Inc., Sunnyvale, CA (US)

( * ) Notice: Subject to any disclaimer, the term of this patent is extended or adjusted under 35 U.S.C. 154(b) by 380 days.

(21) Appl. No.: 11/963,665

(22) Filed: Dec. 21, 2007

(51) Int. Cl.
*G06F 7/00* (2006.01)
*G06F 17/30* (2006.01)

(52) U.S. Cl. .................................. 707/758; 707/822

(58) Field of Classification Search ............ 707/609, 707/638–639, 649, 758, 822, 999.2
See application file for complete search history.

(56) References Cited

U.S. PATENT DOCUMENTS

| | | | |
|---|---|---|---|
| 7,111,014 B2 * | 9/2006 | Sawdon et al. ............... 1/1 |
| 7,403,960 B2 * | 7/2008 | Kodama ................... 1/1 |
| 7,502,801 B2 * | 3/2009 | Sawdon et al. ............... 1/1 |
| 7,562,077 B2 * | 7/2009 | Bisson et al. .................. 1/1 |
| 7,617,370 B2 * | 11/2009 | Jernigan et al. .......... 711/165 |
| 2002/0156840 A1 * | 10/2002 | Ulrich et al. ............. 709/203 |
| 2003/0182301 A1 * | 9/2003 | Patterson et al. .......... 707/102 |
| 2003/0182322 A1 * | 9/2003 | Manley et al. .............. 707/201 |
| 2004/0030668 A1 | 2/2004 | Pawlowski et al. |
| 2005/0004954 A1 * | 1/2005 | Soule, III .................. 707/203 |
| 2005/0246382 A1 | 11/2005 | Edwards |
| 2006/0218135 A1 | 9/2006 | Bisson et al. |
| 2006/0242179 A1 * | 10/2006 | Chen et al. ................ 707/100 |
| 2006/0248273 A1 | 11/2006 | Jernigan, IV et al. |
| 2006/0248378 A1 | 11/2006 | Greanac et al. |
| 2006/0288026 A1 | 12/2006 | Zayas et al. |
| 2007/0067256 A1 | 3/2007 | Zayas et al. |
| 2007/0183224 A1 * | 8/2007 | Erofeev ................ 365/189.05 |
| 2007/0186068 A1 * | 8/2007 | Agrawal ................... 711/162 |

* cited by examiner

*Primary Examiner* — John R. Cottingham
*Assistant Examiner* — Susan F Rayyan
(74) *Attorney, Agent, or Firm* — Perkins Coie LLP (57) ABSTRACT

An embodiment of the invention provides an apparatus and method for presenting differences in a file system. In an embodiment, an application programming interface receives a request from a host, where the request is for a listing of changes in the file system within a time interval. A comparison unit determines each metadata container that has changed in the file system within the time interval. The application programming interface buffers at least one identifier that corresponds to a metadata container that has changed in the file system within the time interval. The application programming interface packages and transmits the at least one identifier to the host. The at least one identifier is readable on the host.

21 Claims, 6 Drawing Sheets

Metadata container (e.g., inode) 385

| | |
|---|---|
| Data file pointer | 386 |
| File size | 387 |
| Number of blocks | 388 |
| Link count | 389 |
| Permissions | 390 |
| Creation time/date | 391 |
| Access time/date | 392 |

PRESENTING DIFFERENCES IN A FILE SYSTEM

TECHNICAL FIELD

Embodiments of the invention relate generally to presenting differences in a file system.

BACKGROUND

In storage technology, a storage appliance is one type of computer that provides services relating to the organization and storage of information or data on storage devices such as, for example, disk drives ("disks"). In other words, a storage appliance is adapted to store and retrieve data on behalf of one or more client processing systems ("clients" or "hosts") in response to external requests received from the hosts. A storage appliance can provide clients with file-level access to data stored in the storage devices. A storage appliance can also provide clients with block-level access to stored data, or with both file-level access and block-level access. For convenience, a storage appliance will be described herein, for the most part, in terms of the former, though the description herein will have application to the latter types of storage appliances as well, as will be apparent to those of ordinary skill in the art in light of the description that follows. Examples of such storage appliances include, but are not limited to, a file server or another type of computing device that provides storage services using a file system to respond to file-oriented data access requests ("filer"). A storage appliance includes a storage operating system that implements the file system to logically organize the information as a hierarchical structure of directories and files on the disks. Each file on a disk may be implemented as a set of data structures, e.g., disk blocks, which are configured to store information. A directory may be implemented as a formatted file in which information by other files and directories is stored.

An implemented disk storage for a storage appliance typically has one or more storage "volumes" which are a collection of physical storage disks and which define an overall logical arrangement of storage space. In other words, a storage volume is a logical container that includes a collection of disks. Therefore, the collection of disks is grouped (assimilated) into the storage volume. Each storage volume is generally associated with a file system.

A software application (e.g., third-party software application) can seek access to a file system in order to determine the changes that have occurred for files or directories in the file system. However, current methods for obtaining the changes in a file system would require the software application to traverse (i.e., perform the known "tree-walk" process) through each directory and through each branch from a directory, and to examine each file in each directory to determine which files have been modified, added, or accessed. The software application itself (which is external to a file server that stores a file system) is required to perform multiple reads to the file system by use of the tree-walk process across the directories in the file system, stores the results of the multiple reads to the file system, and determines the changes in the file system based on the results of these multiple reads to the file system. Furthermore, the tree-walk process by the software application is inefficient because this is a relatively time consuming process where data that are read from the directories are randomly placed across a disk in a non-sequential and random placement. This non-sequential and random placement of data results in a longer time to access the data.

Therefore, the current technology is limited in its capabilities and suffers from at least the above constraints and deficiencies.

SUMMARY OF EMBODIMENTS OF THE INVENTION

An embodiment of the invention provides an apparatus and method for presenting differences in a file system. In an embodiment, an application programming interface receives a request (e.g., via a network) from a host, where the request is for a listing of changes in the file system within a time interval. A comparison unit determines each metadata container (e.g., inode) that has changed in the file system within the time interval. In the discussion herein, an inode is shown as one example of a metadata container. The application programming interface buffers at least one identifier that corresponds to a metadata container that has changed in the file system within the time interval. The application programming interface packages and transmits the at least one identifier to the host. The at least one identifier is readable on the host. The metadata container that has changed in the file system within the time interval is associated with a file or a directory that has changed in the file system within the time interval. A file or directory that has changed in the file system within the time interval can be, for example, a file or directory that has been modified, added, deleted, or accessed within the time interval.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

An embodiment of the invention provides an apparatus and method for presenting differences in a file system. In an embodiment, an application programming interface receives a request (e.g., via a network) from a host, where the request is for a listing of changes in the file system within a time interval. A comparison unit determines each metadata container that has changed in the file system within the time interval. The application programming interface buffers at least one identifier that corresponds to a metadata container that has changed in the file system within the time interval. The application programming interface packages and transmits the at least one identifier to the host. The at least one identifier is readable on the host. The metadata container that has changed in the file system within the time interval is associated with a file or a directory that has changed in the file system within the time interval. A file or directory that has changed in the file system within the time interval can be, for example, a file or directory that has been modified, added, deleted, or accessed within the time interval.

Figure 1:
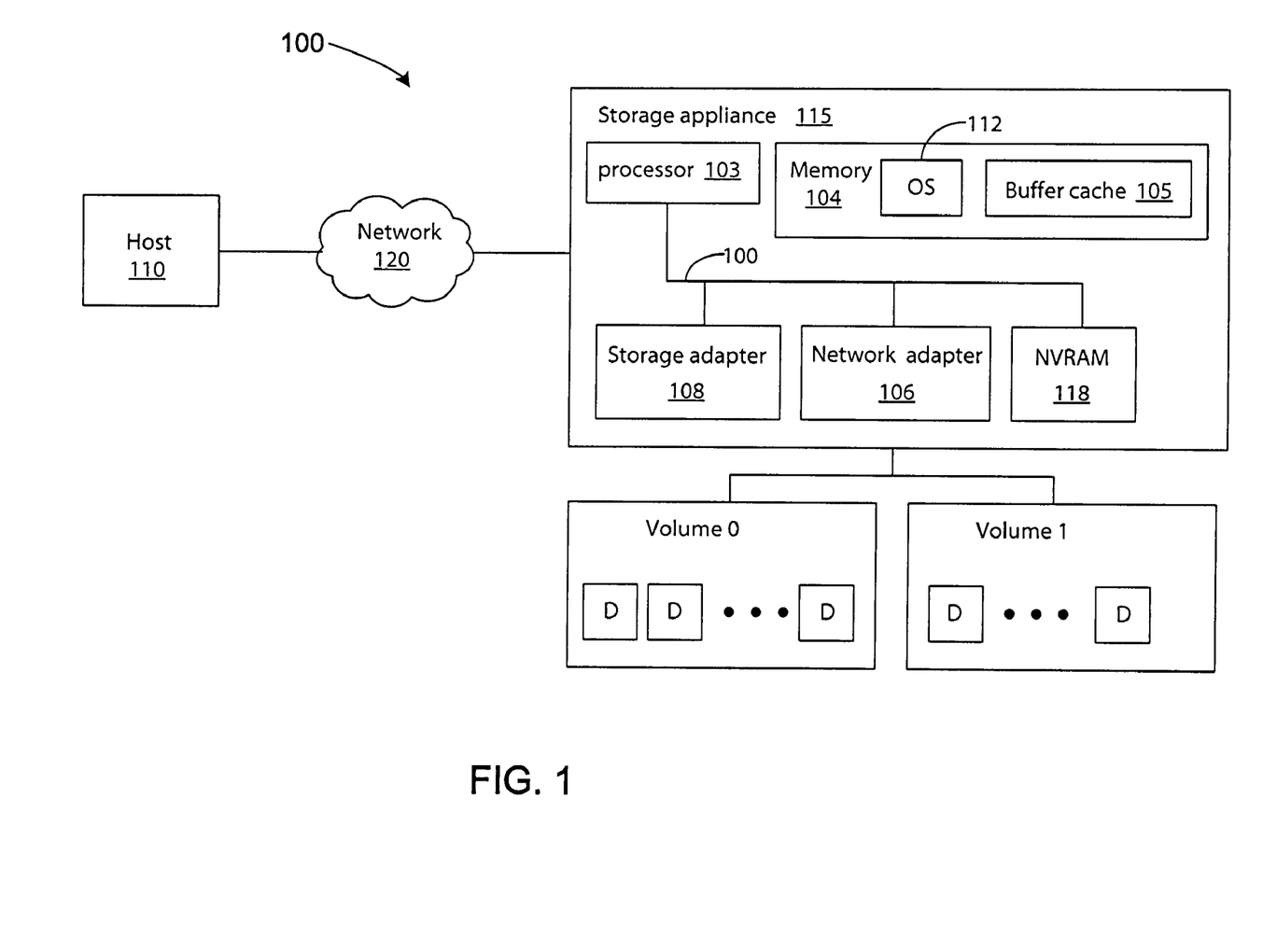
FIG. 1 is a block diagram of an apparatus (system) in accordance with an embodiment of the invention.

FIG. 1 is a block diagram of a system (apparatus) 100, in accordance with an embodiment of the invention. The system 100 includes one or more host devices 110, and one or more storage appliances 115. For purposes of clarity, only one host device 110 and one storage appliance 115 are shown in the example of FIG. 1. The host device 110 and storage appliance 115 can communicate via a network 120 which may be, for example, a local area network (LAN), a wide area network (WAN), virtual private network (VPN), a combination of LAN, WAN and VPM implementations, or another suitable communication network. In another embodiment of the invention, all elements or components that are associated with each of the devices 110 and 115 are implemented in a single device such as, for example, the host device 110. In this alternative implementation, the host device 110 is implemented as a stand-alone computer.

Each of the devices in the system 100 typically includes an appropriate conventional network interface arrangement (not shown) for communicating over the network 102 using a desired communication protocol such as, for example, Transport Control Protocol/Internet Protocol (TCP/IP), User Datagram Protocol (UDP), Hypertext Transfer Protocol (HTTP), Simple Network Management Protocol (SNMP), or other suitable protocols.

A storage appliance is a computer that provides service relating to the organization or storage of information on storage devices, such as, for example, but not limited to, disks. Examples of currently available storage appliance products and associated software components are commercially available from, for example, NETWORK APPLIANCE, INC., Sunnyvale, Calif. or other vendors. Additional details of an example storage appliance are also disclosed in, for example, commonly-assigned U.S. patent application Ser. No. 10/215, 917. In addition, it will be understood to those skilled in the art that the embodiments of the invention described herein may also apply to any type of special-purpose computer (e.g., server) or general-purpose computer, including a stand-alone computer, embodied as a storage appliance or file server. Moreover, the teachings of the embodiments of the invention can also be adapted to a variety of file server architectures including, but not limited to, a network-attached storage environment, or a storage area network and disk assembly directly-attached to a client/host computer. The term "storage appliance" or "file server" or "filer" should therefore be taken broadly to include such arrangements.

The storage appliance 115 includes a processor 103, a memory 104, a network adapter 106, and a storage adapter 108 interconnected by a system bus 110. The storage appliance 115 also includes a storage operating system 112 that implements a file system to logically organize the information as a hierarchical structure of directories and files on a storage device (e.g., disk). Additionally, a persistent storage device 118 such as, for example, a non-volatile RAM (NVRAM) 118 is also typically connected to the system bus 110. Although NVRAMs are shown in FIG. 1, any suitable persistent storage device that retains content in the event of a power failure or other system failure can be used in place of the NVRAMs. An example of a suitable persistent storage device is a battery-backed RAM, although other suitable storage devices may also be used.

As discussed below in additional details with reference to FIG. 3, an application programming interface (API) 315 in an embodiment of the invention can operate with the OS 112 or other application so that the API 315 can perform various operations that are discussed below. The API 315 and comparison unit (module) 355 can be, for example, embodied as software codes that are stored in the memory 104 or stored in other storage devices that are accessible to the processes of the OS 112. The API 315 can operate with the OS 112 or other application so that the API 315 can access or communicate with the network adapter 106. The functionalities of the API 315 and the comparison unit 355 are discussed below in additional details.

In an illustrative embodiment, the memory 104 may have storage locations that are addressable by the processor 103 for storing software program code or data structures for use in the functions of the storage appliance 115. The processor 103 and adapters 106 and 108 may, in turn, include processing elements and/or logic circuitry configured to execute the software code and manipulate the data structures.

The storage operating system 112, portions of which are typically resident in memory 104 and executed by the processing elements, functionally organizes a storage appliance by inter-alia invoking storage operations in support of the file services that are implemented by the storage appliance. It will be apparent by those skilled in the art that other processing and memory implementations, including various computer readable media may be used for storing and executing program instructions pertaining to the inventive techniques described herein.

The network adapter 106 includes the mechanical, electrical, and signaling circuitry for connecting the storage appliance 115 to a host 110 over the computer network 120 or connecting the storage appliance 115 to other storage appliance(s). A host 110 can be a general-purpose computer configured to execute applications including file system protocols such as, for example, the Network File System (NFS) or the Common Internet File System (CIFS) protocol or other suitable protocols. Moreover, the host 110 can interact with the storage appliance 115 in accordance with the known client/server model of information delivery.

The storage adapter 108 cooperates with the storage operating system 112 in order to access information requested by the host 110. Each storage volume is constructed from an array of physical storage devices (D) that are typically organized as, for example, RAID groups. The RAID groups include independent physical disks including those storing a striped data and those storing separate parity data. The number of physical storage devices (e.g., disks) in a storage volume and in a RAID group may vary.

The storage adapter 108 includes input/output interface circuitry that couples to the storage devices over an I/O interconnect arrangement such as, for example, a conventional high-speed/high-performance fibre channel serial link topology. The information is retrieved by the storage adapter 108, and may be processed by the processor 103 (or the adapter 108 itself) prior to being forwarded over the system bus 110 to the network adapter 106, where the information is formatted into a packet and returned to the host 110.

To facilitate access to the storage devices D, the storage operating system 112 typically implements a file system that logically organizes the information as a hierarchical structure of directories in files on the storage devices D. Each file on a storage device D may be implemented as a set of data blocks (i.e., disk blocks) configured to store information such as text or other format. The directory may be implemented as a formatted file in which other files and directories are stored. The storage operating system 112 associated with each volume is, for example, the Data ONTAP® storage operating system which is commercially available from NETWORK APPLIANCE, INC. Additional details of an example storage operating system 112 are disclosed in, for example, commonly-assigned U.S. patent application Ser. No. 10/836,090. The Data ONTAP storage operating system implements a Write Anywhere File Layout (WAFL)® file system. However, it is expressly contemplated that the principles of embodiments of this invention can be implemented using a variety of alternate storage operating system architectures.

Figure 2:
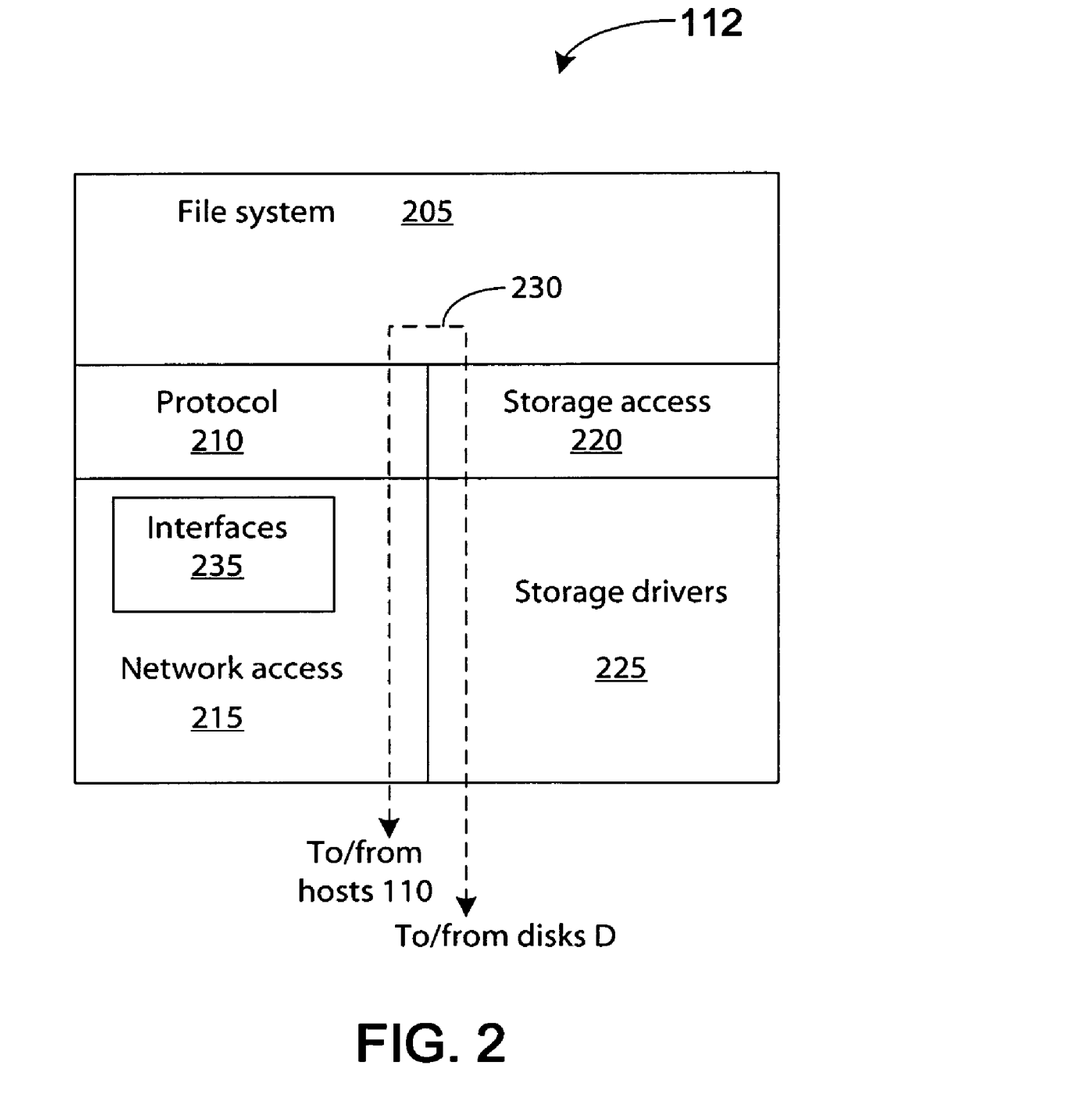
FIG. 2 is a block diagram of a storage operating system that can be used in an embodiment of the invention.

FIG. 2 is a schematic block diagram of an example storage operating system 112 that may be advantageously used in an embodiment of the invention. As shown, a storage operating system 112 includes several modules, or "layers". These layers include a file system 205. The file system 205 is application-layer software that keeps track of the directory structure (hierarchy) of the data stored in a storage subsystem and manages read/write operations on the data (i.e., executes read/write operations on the storage devices D, e.g., disks, in response to client requests). The operating system 112 also includes a protocol layer 210 and an associated network access layer 215, to allow a storage appliance to communicate to devices in a network, such as the host 110. The protocol 210 layer implements one or more of various higher-level network protocols, such as, for example, Network File System (NFS), Common Internet File System (CIFS), Hypertext Transfer Protocol (HTTP) and/or Transmission Control Protocol/Internet Protocol (TCP/IP), which are network protocols that are known to those skilled in the art. The network access layer 215 includes one or more drivers that implement one or more lower-level protocols to communicate over the network, such as Ethernet. The network access layer 215 may incorporate one or more interfaces 235 that receive input commands from a user.

The storage operating system 112 also includes a storage access layer 220 and an associated storage driver layer 225, to allow a storage appliance to communicate with a storage subsystem. The storage access layer 220 implements a higher-level disk storage protocol, such as RAID, while the storage driver layer 225 implements a lower-level storage device access protocol, such as Fibre Channel Protocol (FCP) or SCSI, which are protocols that are known to those skilled in the art. Also shown in FIG. 2 is path 230 which represents the data flow through the storage operating system 112 associated with a read or write operation. Additional details of an example storage operating system 112 are described in, for example, commonly-assigned U.S. patent application Ser. No. 10/836,090 and 11/117,852.

As used herein, the term "storage operating system" generally refers to the computer-executable code operable to perform a storage function in a storage appliance, e.g., that manages data access and may, in the case of a file server, implement file system semantics. In this sense, the Data ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage appliance 115. An example of a multi-protocol storage appliance that may be advantageously used with the present invention is described in commonly-assigned U.S. patent application Ser. No. 10/215,917. Moreover, the teachings of this invention can be adapted to a variety of storage appliance architectures or storage system architectures including, but not limited to, a network-attached storage environment, a storage area network and disk assembly directly-attached to a client or host computer. The term "storage appliance" should therefore be taken broadly to include such arrangements in addition to any subsystems configured to perform a storage function and associated with other equipment or systems.

Figure 3:
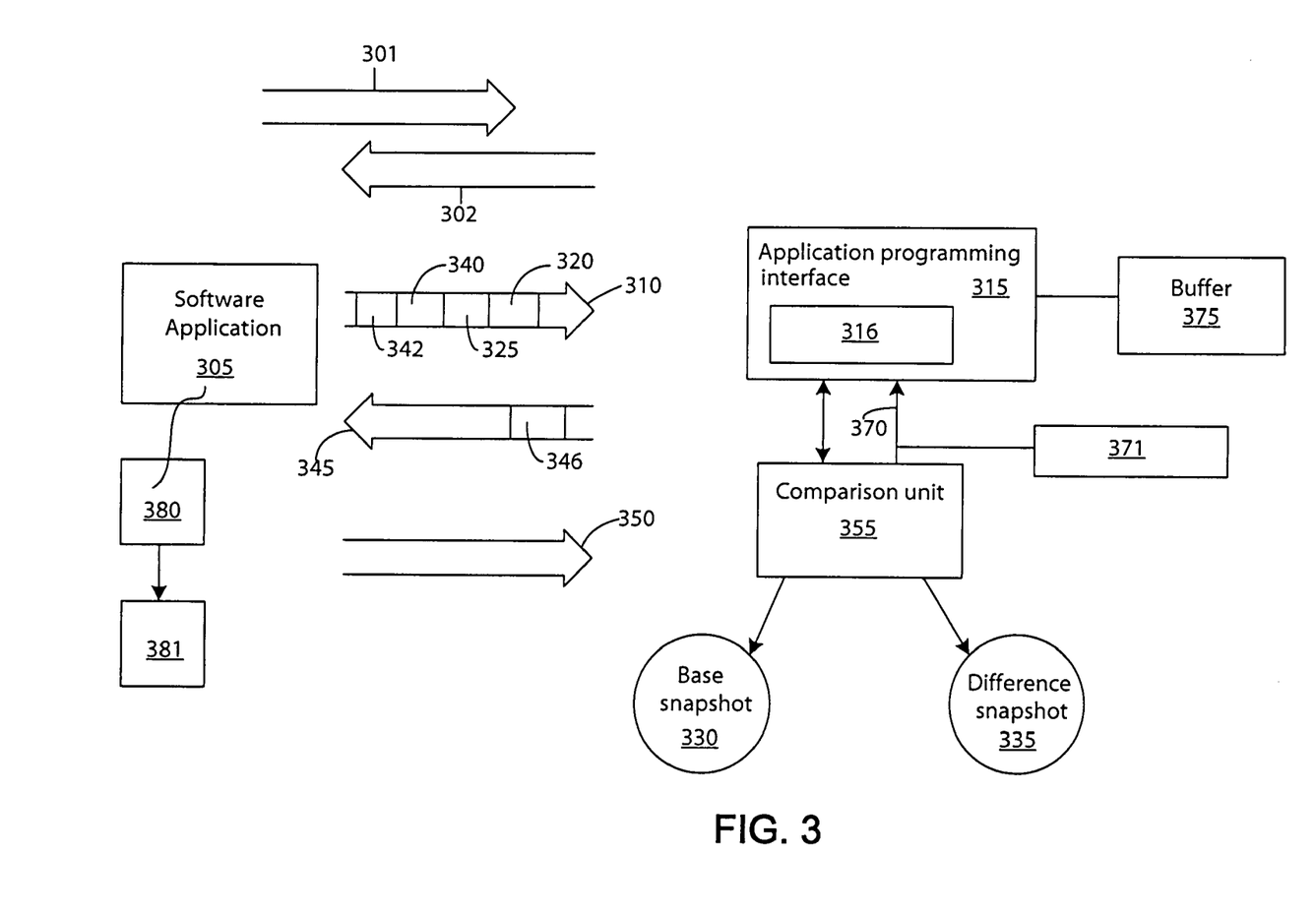
FIG. 3 is a block diagram that shows additional details of an embodiment of the invention.

FIG. 3 is a block diagram that illustrates additional details of an embodiment of the invention. A software application 305 (in the host 110 of FIG. 1) sends a session request 301 to the storage appliance 115 (FIG. 1). The software application 305 is, for example, a third-party software application that is external to the storage appliance 115. In an embodiment of the invention, an application programming interface (API) 315 (included in or communicating with the storage appliance 115) responds to the session request 301 with a session identifier 302 so that a session is established between the client 110 and the storage appliance 115. As known to those skilled in the art, a session is a series of interactions between two communication end points that occur during the span of a single connection. Typically, one end point requests a connection with another specified end point and if that end point replies and agrees to the connection request, then the end points take turns exchanging commands and data (i.e., "talking" to each other). The session begins when the connection is established at both ends and terminates when the connection is ended.

Figure 4A:
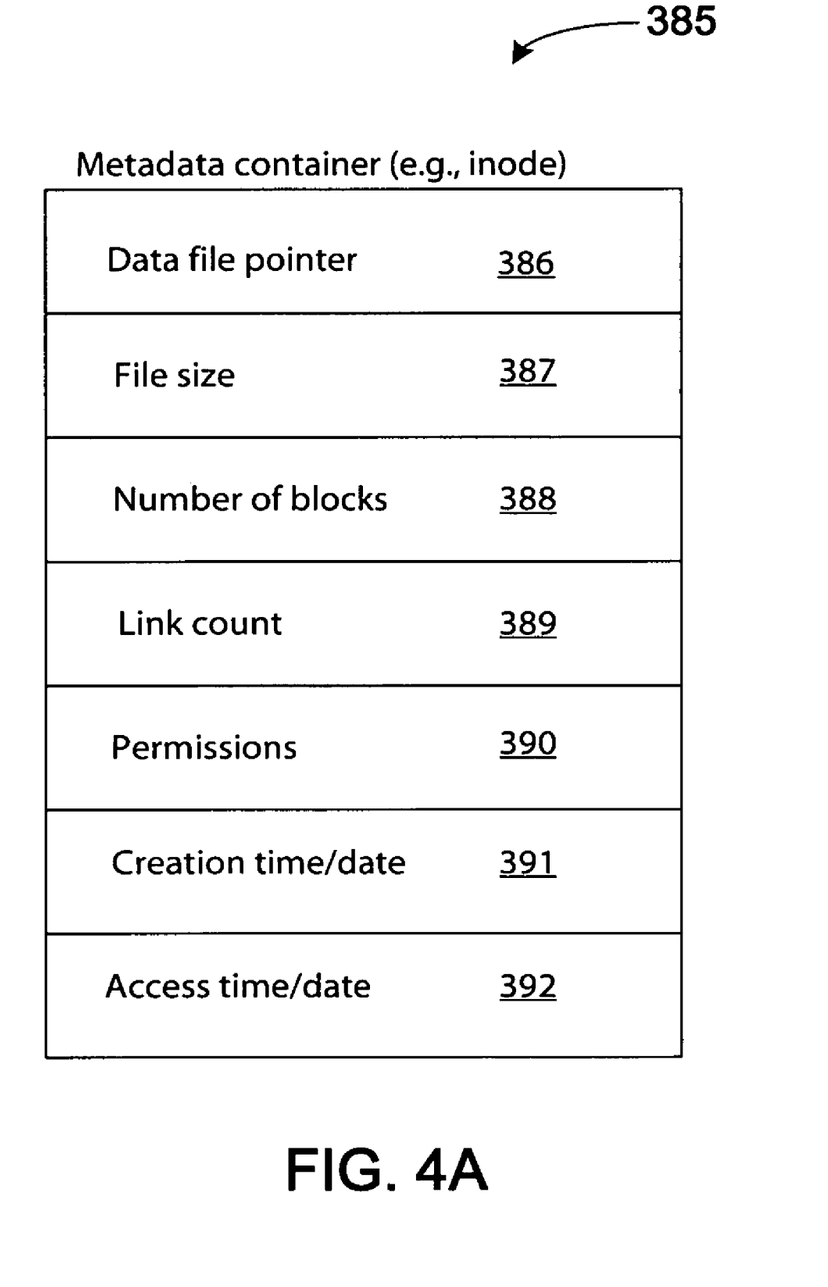
FIG. 4A is a block diagram of a metadata container (e.g., inode) that can be used in an embodiment of the invention.

When a session is established between the client 110 and the storage appliance 115, the software application 305 can send a request 310 to the storage appliance 115 (FIG. 1). In an embodiment of the invention, the application programming interface (API) 315 in the storage appliance receives the request 310. The request 310 is a request to determine the changes that have occurred for files or/and directories in the file system of storage appliance 115 within a time interval as discussed further in the examples below. For purposes of the discussion herein, a modification or change in a file system can include modifying, adding, deleting, or accessing a file or directory in a file system of the storage appliance 115. The request 310 includes a field 320 that indicates (identifies) the data subset (e.g., volume) that will be checked for modified files or/and directories in the file system. The request 310 also includes a field 325 that indicates the data subset (e.g., base persistent point-in-time image or snapshot) to be used as the base snapshot 330 (or base persistent point-in-time image (PPTI) 330) which is defined below. A snapshot is a specified subset of data that is maintained by the storage appliance 115. SNAPSHOT' is a trademark of Network Appliance, Inc. Typically, this specified subset of data is, for example, a volume of data. A volume may include data stored on one or more physical storage devices such as, e.g., the storage devices D in FIG. 1. Although snapshots are discussed herein as examples of the above-mentioned data subset, it is within the scope of embodiments of the invention that the data subset can be any suitable type of persistent point-in-time image (PPTI) which is a point-in-time representation of data (e.g., file system) that is stored on a storage device (e.g., disk). Associated with each file in a volume is a set of metadata for that file, such as a pointer to the file, the file size, the number of blocks included in the file, permissions, etc. This set of metadata is stored in a unit of storage called a metadata container 385 (see FIG. 4A). One example of a metadata container 385 is an "inode" which is shown as example inode 385 in FIG. 4A. Each file in a volume has a separate metadata container (e.g., inode) which contains the file's metadata. The main purpose of an inode 385 is to store metadata about a particular data file, including a pointer 386 (FIG. 4A) to the tree structure of the data file, the size 387 (e.g., in kilobytes) of the data file, the number 388 of data blocks in the data file, the link count 389 (number of references to that data file in the volume), permissions 390 that are associated with the data file, creation time/date 391 of the data file, and access time/date 392 to the data file. An inode 385 may also include other metadata that are not mentioned herein. Whenever an actual data block in a file is modified, added, deleted, or renamed, at least some of the metadata in that file's inode 385 will necessarily change. Therefore, by comparing the contents of an inode 385 in one PPTI (e.g., snapshot) with the contents of the corresponding inode in another PPTI (e.g., snapshot), it is possible to determine whether the associated file changed from one PPTI to the other PPTI. If the contents of the two corresponding inodes are different, then the file has changed. If the inode contents are identical, then the file has not changed. The base snapshot 330 (or base (first) PPTI 330) is a prior PPTI (e.g., snapshot) of a volume at a given start time (first time value) T1, and the difference snapshot 335 (or difference (second) PPTI 335) is a subsequent PPTI (e.g., snapshot) of the same volume at a later time (second time value) T2. As an example, time T2 may be the latest or current time that has occurred when the request 310 is received by the API 315. Therefore, base snapshot 330 can be a data subset (e.g., a volume) in a file system at a given start time T1 and the difference snapshot 335 can be the same data subset (e.g., the same volume) at a given end time T2. Therefore, the user can indicate (typically, via software application 305) a time T1 in the field 325 and this time T1 will correspond to an appropriate base snapshot. The user can optionally indicate (typically, via software application 305) a time T2 in field 342 of the request 310, and this time T2 will correspond to an appropriate difference snapshot 335. Alternatively, the difference snapshot 335 will correspond to the snapshot of the given volume at the current time when the request 310 is received by the API 315, and in this case, the field 342 in the request 310 is not used or does not include a value.

In an embodiment, the request 310 may include a maxdiff value (threshold amount) 340 which indicates the maximum number of listed changed metadata containers (e.g., inodes) for files or/and directories in the data subset (e.g., volume) that will be contained in a single response 345 from the API 315. For example, if the maxdiff value 340 is set at 50 (where maxdiff is typically set by a user via software application 305), then each response 345 from the API 315 will indicate up to 50 identifiers 370 of changed metadata containers that correspond to files and/or directories that have changed in a given data subset (e.g., volume) between time T1 and time T2. For each request 310 from a software application 305, the API 315 will forward each request 315 to the comparison unit 355.

Based on the contents in the fields 320, 325, 340, and 342 in the requests 310, the comparison unit 355 determines the metadata containers (e.g., inodes) of files and/or directories that have changed between the time interval from T1 to T2. The comparison unit 355 compares the metadata containers (e.g., inodes) in the base snapshot 330 with the same metadata containers (e.g., inodes) in the difference snapshot 335, in order to determine which metadata containers have changed from the time T1 to time T2. Additional details of the comparison between the snapshots (data subsets) 330 and 335 is discussed in an example below with reference to FIG. 4B. An example of a suitable comparison unit 355 is disclosed in commonly-assigned U.S. patent application Ser. No. 11/093, 074.

A response 345 is sent from the API 315 to the software application 305, until all identifiers 370 of metadata containers of changed files or changed directories are reported in response to the previous request 310. When all identifiers 370 of metadata containers of changed files or changed directories have been reported via the response(s) 345, the software application 305 can typically send a request 350 to end the session between the host 110 and the storage appliance 115.

The identifiers 370 that identify all metadata containers of files or directories that have been modified between the time interval beginning at T1 and ending at T2 are listed in a listing 380 which is transmitted in the one or more responses 345. Therefore, an identifier 370 will identify a metadata container number 371 of a metadata container of a file or directory that has been modified between T1 and T2, inclusive. The listing 380 of metadata containers of changed files or changed directories is useful in, for example, creating a catalog of information of a file system of the storage appliance 115. This listing 380 will list the metadata containers that have changed in the file system. The listing 380 may also include other information such as, for example, a listing of file name changes or directory name changes (where these name changes are determined by the metadata container comparison by the comparison unit 355), metadata container numbers (which identifies a file or directory that corresponds to the metadata container), access time/date, creation time/date, modification time/date, and/or changes in file size. Therefore, the identifier 370 can also include these other information.

As one example of a benefit that is provided by the generation of the listings 380, the listings 380 advantageously permit a faster update of a standard file system index 381 which can be in a memory of a host 110 or can be in a storage space (e.g., disk) that is accessible to the host 110. As known to those skilled in the art, generally, a file system index may be any data structure that organizes a collection of metadata according to some aspect or attribute and permits the host 110 to query the content of a file system based on the aspect or attribute that is indexed in the index 381. Various software applications for creating and updating a file system index are commercially available from various vendors (e.g., Microsoft Corporation). As an example, an index 381 may list a name of all files in a file system or can sort the file system content based on associated user, content creation or modification time, or other attributes. Since the list 380 indicates only the files or directories that have been changed in a file system, a user can use a standard software application for creating/ updating a file system index in order to update the attributes contents in the index 381 based on the listing 380. Therefore, a faster update of the index 381 is possible because only the attributes that are identified in the list 380 are updated by a user in corresponding attributes entries in the index 381. As mentioned above, a user can use any commercially available suitable software application for updating the file system index 381.

The API 315 can implement other functionalities such as, for example, the functionalities in the Zephyr API which is a proprietary API that is provided by Network Appliance, Inc. The API 315 typically includes software components and operates with standard hardware components in order to perform the various functions that are discussed herein. The software components in the API 315 are represented by the software module 316 which can be programmed by use of suitable known software programming languages (e.g., C, C++, or other languages) and by use of known programming techniques.

The transmissions of requests and responses between the software application 305 and API 315 can use, for example, XML (extensible markup language). As known to those skilled in the art, XML is commonly used on the Internet to create simple methods for the exchange of data among diverse clients or hosts. However, different transport mechanisms that are known to those skilled in the art can alternatively be used for the transmissions of the requests 310 and responses 345. The functions calls in a transport mechanism may require modification depending on, for example, if transmissions are being sent via a socket, fibre channel, SCSI, or via TCP/IP.

The comparison unit 355 will assign and transmit an identifier 370 for each metadata container (e.g., inode) corresponding to a file or directory that has been changed (e.g., added, deleted, modified, or accessed) in the interval from time T1 to time T2. The API 315 will receive the identifiers 370 and will initially buffer the identifier 370 in the buffer 375, as discussed further below. As mentioned above, the comparison unit 355 can be implemented as, for example, a software code that resides in the memory 104 (FIG. 1). An identifier 370 can be any identifier that identifies a metadata container (e.g., inode). Each identifier will identify a unique metadata container. As an example, an identifier can be bit values that are unique for each metadata container. In this example, an identifier with the value 00001111 would be an identifier for a particular metadata container while another identifier with the value 00000011 would be an identifier for another metadata container. In an embodiment of the invention, the API 315 will receive the identifiers from the comparison unit 355 and will buffer the identifiers 370 in a buffer 375. When the number of buffered identifiers 370 in the buffer 375 has reached the maxdiff value (maximum difference value) 340, the API 315 will package and transmit the identifiers 370 in the response 345 which is sent to the host 110. When the API 315 stops receiving any identifier 370 from the comparison unit 355, then all changed metadata containers in the interval T1-T2 have been identified by the comparison unit 355 and the API 355 will then package and transmit any remaining buffered identifiers 370 in the buffer 375 via the response 345 that is transmitted to the host 110. The API 315 will format the identifiers 370 in the response 345 into a listing 380 that is readable by the software application 305. This listing 380 will list the identifiers 370 of metadata containers that have changed for the specified volume, in the interval from time T1 and time T2. Also, each changed metadata container (that are listed in the listing 380) will list a corresponding metadata container number that identifies the directory or file for that changed metadata container. As an example, the contents in the listing 380 in the response 345 are formatted by the API 315 into the above-mentioned XML language which is a standard data file that can be parsed by most software packages. If the XML language format is used for the listing 380, the contents in the listing 380 is typically in a text format that any standard text editor software in a host 110 can open to allow viewing by a user of the host 110. The text editor can be, for example, a separate software module in the host 110 or is a software module or is a feature that is integrated with the software application 305. Additionally, XML formats a document into a hierarchically-structured format which is suited for contents that are formed by lists or records.

Figure 4B:
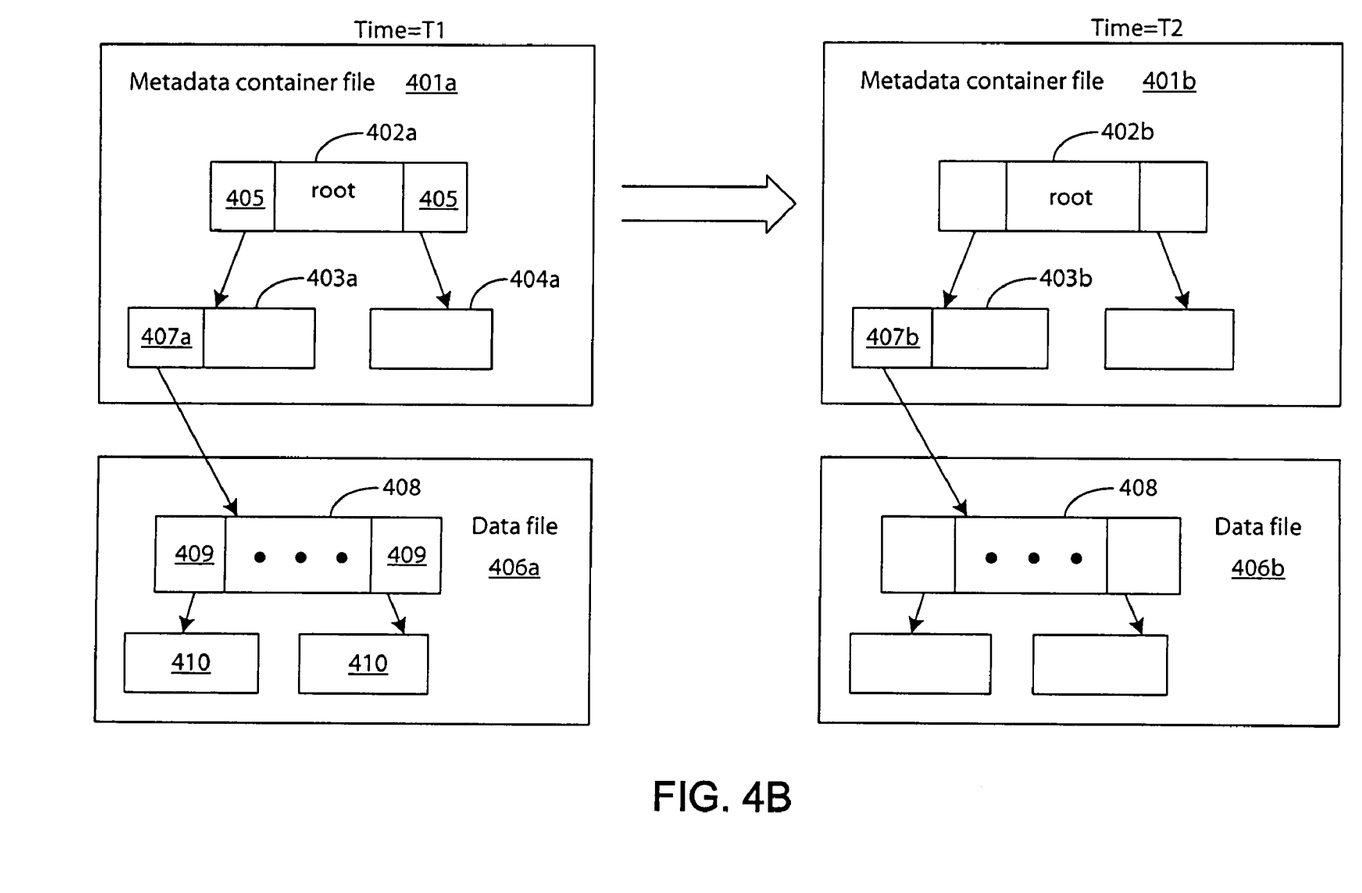
FIG. 4B is a block diagram of a data subset (e.g., snapshot) that can be used in an embodiment of the invention.

As shown in the example of FIG. 4B, the structure of a PPTI (i.e., data subset) includes a metadata container file which has information about all metadata containers (e.g., inodes) for a given volume. As an example, the base snapshot 330 has a corresponding metadata container file 401a which stores information about all metadata containers (e.g. inodes) for a given data subset such as, e.g., a volume, with the state of the data subset (e.g., volume) taken at time T1. The metadata container file 401a has a hierarchical structure with a root node 402a. The root node 402a has fields 405 that each contains pointers to another node in the metadata container file 401a. This other node can be an indirect block (not shown in FIG. 4) which points to another node, or a direct block 403a and a direct block 404a as shown in the example of FIG. 4. The direct blocks 403a and 404a includes metadata containers of files for the given data subset (e.g., volume). For example, the metadata container 407a includes a pointer to a corresponding data file 406a which has the data of a file that corresponds to the metadata container 407a. The metadata container 407a also includes metadata that relates to the data file 406a.

The data file 406a is also in a hierarchical structure and includes a root node 408 with fields 409 that contain pointers to direct data blocks 410. The direct data blocks 410 contain a portion of the actual data of the file that corresponds to the metadata container 407a.

The difference snapshot 335 has a corresponding metadata container file 401b which stores information about all metadata containers for the same given data subset (e.g., volume), with the state of the data subset (e.g., volume) taken at time T2. Therefore, root node 402b is the root node 402a at time T2. The comparison unit 355 compares each metadata container in the metadata container file 401a with the same metadata container in the metadata container file 401b, in order to determine if a file or directory corresponding to the metadata container has changed (i.e., modified, added, deleted, or accessed) between the time T1 and time T2. For example, the comparison unit 355 compares the content in a particular field in the metadata container 407a at time T1 with the content in the same particular field in the same metadata container (shown as metadata container 407b) at time T2. If the contents in the field have changed between time T1 and time T2, then the metadata container is a changed metadata container. The fields in a metadata container would indicate, for example, a data file pointer, file size, number of blocks for the file, link count, permissions, creation time/date, and access time/date. The comparison unit 355 compares the fields with the data file pointer, file size, number of blocks for the file, link count, permissions, creation time/date, and access time/date in the metadata container 407a with corresponding fields in the metadata container 407b, in order to determine if a metadata container has been modified between time T1 and time T2. These fields were previously discussed above with reference to FIG. 4A.

Since a metadata container file is sequentially accessed by the comparison unit 355, the speed of determining the changed metadata containers is increased. Note that a third party software application 305 (which is external to a storage appliance) is not able to access and not able to read the metadata container files in the file system. Furthermore, the API 315 and the comparison unit 355 advantageously eliminates the use of the above-discussed previous techniques where an external software application 305 is required to perform multiple reads in a file system to determine the changes in the file system.

For a directory metadata container (e.g., directory inode), the comparison unit 355 can read the directory metadata container blocks in parallel for faster speed. The contents of a directory metadata container blocks are the names and references for the metadata containers in that directory. The comparison unit 355 can simultaneously read two (2) or more directory metadata container blocks and compare them to corresponding directory metadata container blocks at time T2 in order to determine changes in the directories in the file system. This metadata container comparison process is further described in, for example, the above cited U.S. application Ser. No. 11/093,074.

Another embodiment of the invention can have the optional feature of providing access security by the API 315, so that only authorized requests 310 are processed by the API 315. In this case of using authorized requests 310, as an example, the session request 301 would include a password field that would be authenticated by the API 315 before a session is established between the host 110 and storage appliance 115. Another embodiment of the invention can have the optional feature where the API 315 can send a progress indicator to the application software 305 to indicate the progress of the above-discussed metadata container comparison process.

Figure 5:
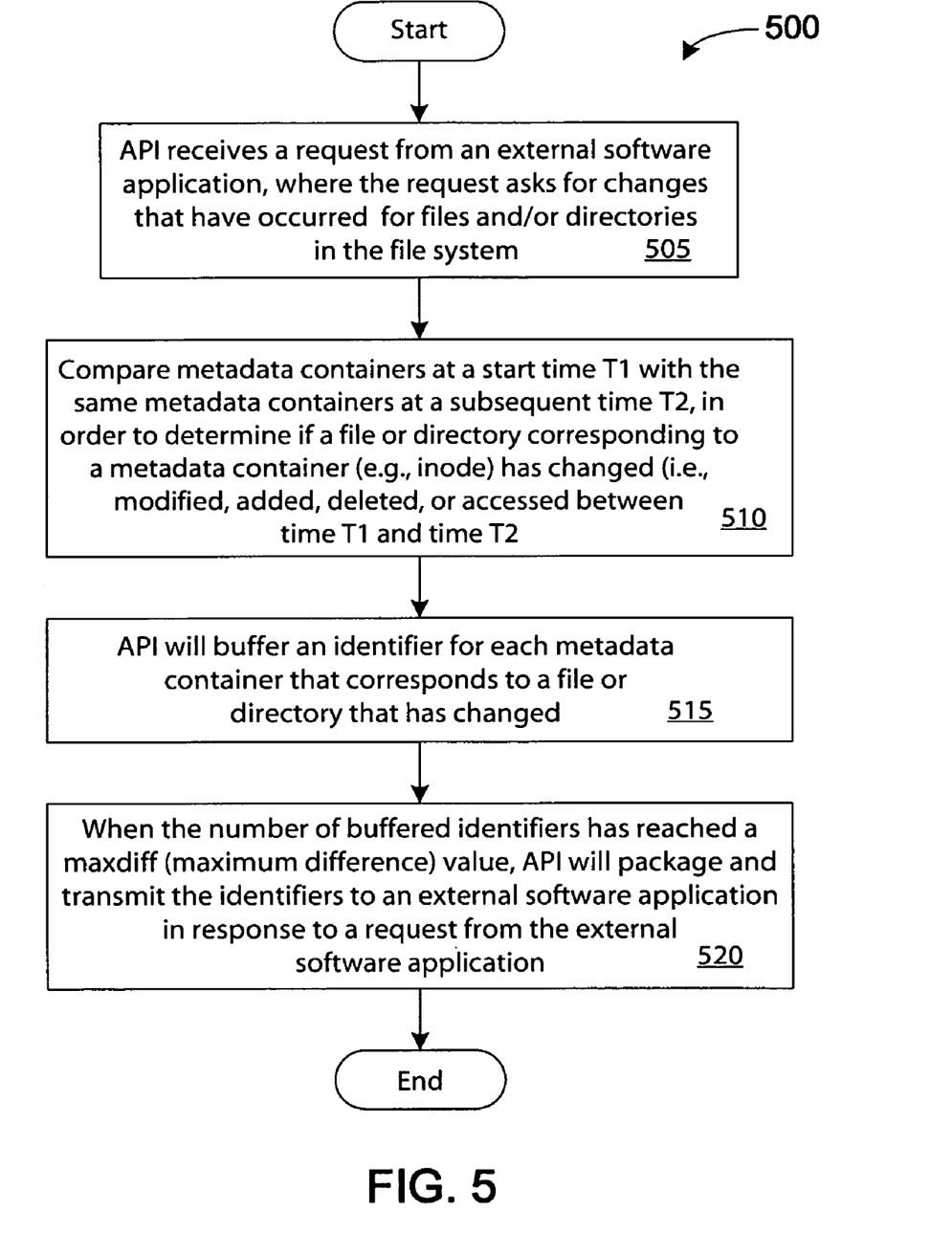
FIG. 5 is a method in accordance with an embodiment of the invention.

FIG. 5 is a method 500 in accordance with an embodiment of the invention. In block 505, the API 315 receives a request 310 from an external software application 305, where the request 301 asks for changes that have occurred for files and/or directories in the file system in, for example, the storage appliance 115.

In block 510, the comparison unit 355 compares metadata containers (e.g., inodes) in the file system at a start time T1 with the same corresponding metadata container at a subsequent time T2, in order to determine if a file or directory corresponding to a metadata container in the file system has changed (i.e., modified, added, deleted, or accessed) between time T1 and time T2.

In block 515, API 315 will buffer an identifier 370 for each metadata container that corresponds to a file or directory that has changed.

In block 520, when the number of buffered identifiers 370 (buffered in buffer 375) has reached a maxdiff value (maximum different value), the API 315 will package and transmit the identifiers 370 in a response 345 to the external software application request 310. When the API 355 stops receiving any identifier 370 from the comparison unit 355, the API 355 will package and transmit any remaining buffered identifiers 370 in the buffer 375 via the response 345 that is transmitted to the external software application 305.

It is also within the scope of an embodiment of the present invention to implement a program or code that can be stored in a machine-readable medium to permit a computer to perform any of the methods described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of presenting differences in a file system, the method comprising:
    receiving a request from a host, where wherein the request is for an identification of changes in the file system within a time interval;
    determining a metadata container that has changed in the file system within the time interval by comparing a first record of the metadata container with a second record of the metadata container, wherein the comparing includes performing a comparison of nonpointer fields of the first record and of the second record;
    buffering an identifier that corresponds to, the metadata container that has changed in the file system within the time interval; and
    packaging and transmitting the identifier to the host, wherein the identifier is readable on the host, wherein packaging and transmitting the identifier to the host includes packaging and transmitting buffered identifiers when an amount of buffered identifiers reaches a threshold.

2. The method of claim 1, wherein the host includes a software application that sends the request for the identification of changes in the file system within the time interval.

3. The method of claim 1, wherein determining the metadata container that has changed in the file system within the time interval includes comparing a metadata container in a data subset during a starting time T1 and during a subsequent time T2.

4. The method of claim 1, further comprising:
    generating the identification of buffered identifiers including the identifier, wherein the identification is readable on the host.

5. The method of claim 1, further comprising:
    sending from a host a request for changes in a file system.

6. The method of claim 5, further comprising:
    in response to the request, sending a response including the identifier that corresponds to the metadata container that has changed in the file system within the time interval.

7. The method of claim 1, wherein the metadata container is associated with a file or a directory that has changed in the file system within the time interval.

8. The method of claim 7, wherein the file or directory that has changed in the file system within the time interval includes a file or directory that has been modified, added, deleted, or accessed within the time interval.

9. The method of claim 1, further comprising:
    using in the host the identifier to update a file system index.

10. A method of presenting differences in a file system, the method comprising:
    receiving a request from a host, wherein the request is for a listing of changes in the file system within a time interval;
    comparing metadata containers in a first persistent point-in-time image of the file system corresponding to a first time value with metadata containers in a second persistent point-in-time image of the file system corresponding to a second time value, wherein the comparing includes performing a comparison of nonpointer fields of the metadata containers in the first persistent pointin-time image with nonpointer fields of the metadata containers in the second persistent point-in-time image;

determining each metadata container that has changed in the file system within the first time value and second time value;

assigning an identifier for each metadata container that has changed in the file system within the first time value and the second time value;

buffering each identifier that corresponds to a metadata container that has changed in the file system within the first time value and second time value; and packaging and transmitting each identifier to the host, where each identifier is readable on the host, wherein each identifier is transmitted and packaged when an amount of buffered identifiers reaches a threshold.

11. The method of claim 10, wherein the host includes a software application that sends the request for the listing of changes in the file system within the first and second time values.

12. The method of claim 10, further comprising:
generating a listing of the identifiers, wherein the listing is readable on the host.

13. The method of claim 10 further comprising:
sending from the host a request for changes in a file system.

14. The method of claim 13, further comprising:
sending to the host a response including an identifier that corresponds to a metadata container that has changed in the file system within the first time value and second time value, in response to the request.

15. The method of claim 10, wherein the metadata container is associated with a file or a directory that has changed in the file system within the first time value and second time value.

16. The method of claim 15, wherein a file or directory that has changed in the file system within the first time value and second time value comprises a file or directory that has been modified, added, deleted, or accessed within the time interval.

17. The method of claim 10, further comprising:
using in the host the identifier to update a file system index.

18. An apparatus for presenting differences in a file system, the apparatus comprising:
a processor;
a storage operating system that is executable by the processor; and
an application programming interface that operates with the processor and that is configured to receive a request from a host, wherein the request is for a listing of changes in the file system within a time interval, configured to compare a first record of nonpointer fields of a metadata container with a second record of the nonpointer fields of the metadata container, configured to buffer an identifier that corresponds to a metadata container that has changed in the file system within the time interval based on the comparing, and configured to package and transmit the identifier to the host, wherein the identifier is readable on the host, and wherein the application programming interface is configured to package and transmit buffered identifiers when an amount of buffered identifiers reaches a threshold.

19. The apparatus of claim 18, wherein the host includes a software application that sends the request for the listing of changes in the file system within the time interval to the apparatus.

20. The apparatus of claim 18, wherein each metadata container that has changed in the file system within the time interval is determined by comparing a metadata container in a data subset during a starting time T1 and during a subsequent time T2.

21. The apparatus of claim 18, wherein the application programming interface is configured to generate a listing of the identifiers, wherein the listing is readable on the host.

* * * * *